(12) United States Patent
Sood

(10) Patent No.: US 6,233,523 B1
(45) Date of Patent: May 15, 2001

(54) METHOD OF COLLECTION AND LINKING OF POSITIONAL DATA FROM SATELLITE LOCALIZATION AND OTHER DATA

(75) Inventor: Ralf A. Sood, Garbsen (DE)

(73) Assignee: iBS Integrierte Business Systeme GmbH, Garbsen (DE)

( * ) Notice: Subject to any disclaimer, the term of this patent is extended or adjusted under 35 U.S.C. 154(b) by 0 days.

(21) Appl. No.: 09/164,709

(22) Filed: Oct. 1, 1998

(30) Foreign Application Priority Data

Oct. 2, 1997 (DE) .............................................. 197 43 705

(51) Int. Cl.[7] .................................................... G01C 21/28
(52) U.S. Cl. .......................... 701/213; 701/207; 348/118; 348/142
(58) Field of Search .................................... 701/200, 207, 701/208, 209, 213, 214; 340/988, 990, 995; 348/135, 142, 143, 139, 159, 118

(56) References Cited

U.S. PATENT DOCUMENTS

| 5,107,433 | 4/1992 | Helldörfer et al. | 340/955 |
|---|---|---|---|
| 5,214,757 | 5/1993 | Mauney et al. | 701/213 |
| 5,633,946 | 5/1997 | Lachinkski et al. | 701/200 |
| 5,642,285 | * 6/1997 | Woo et al. | 701/213 |
| 6,047,234 | * 4/2000 | Cherveny et al. | 701/214 |
| 6,085,148 | * 7/2000 | Jamison et al. | 701/214 |

FOREIGN PATENT DOCUMENTS

| 3744532 | 7/1989 | (DE) . |
|---|---|---|
| 195 05 487 | 9/1995 | (DE) . |
| 195 25 291 | 12/1996 | (DE) . |

OTHER PUBLICATIONS

Hunter, Vehicle Navigation Using Differential GPS, pp. 392–398 (1990).
Bossler, Using the GPSVan: Operational efficiencies through GIS and GPS, pp. 833–835 (1994).
Schwartz et al, VIASAT—A Mobile Highway Survey System of High Accuracy, pp. 476–481 (1993).
Yee, GPS & Video Data and Collection in Los Angeles County—A Status Report, pp. 388–393 (1994).

* cited by examiner

Primary Examiner—Gary Chin
(74) Attorney, Agent, or Firm—Davidson, Davidson & Kappel, LLC

(57) ABSTRACT

The present invention refers to a method of collection and linking of positional data obtained by satellite localization and other data. At least one vehicle travels through substantially all streets of one or several continuous areas, with a satellite localization device continuously and automatically gathering positional data relating to the actual position of each vehicle and with one or several cameras taking pictures of individual adjacent buildings, substantially from a horizontal point of view. The postal addresses of the buildings contained in the taken pictures are determined, with at least the house numbers being determined by means of a house number sign on the buildings. For each individual building the positional data, data relating to the postal address and at least one digitized picture of the building are linked together and recorded in a database. This allows very accurate vehicle navigation systems but also many other applications not limited to vehicles.

22 Claims, 2 Drawing Sheets

US 6,233,523 B1

METHOD OF COLLECTION AND LINKING OF POSITIONAL DATA FROM SATELLITE LOCALIZATION AND OTHER DATA

TECHNICAL FIELD

The present invention relates to a method of collection and linking of positional data obtained by satellite localization and other data.

BACKGROUND TECHNOLOGY

GPS (Global Positioning System) and GLONASS (Global Orbiting NAvigation Satellite System) satellite navigation systems, jointly forming the base for a global satellite navigation system GNSS (Global Navigation Satellite System), allow a multitude of practical applications, the most important of which are navigation systems for shipping, aviation and terrestrial traffic. For an introduction to the technology and applications of satellite navigation, see "Scientific American", February 1996, pp. 32 to 38.

In addition to the present position of a vehicle, which is obtained by a satellite localization device, digitized maps are required for vehicle navigation, which may be linked to additional information, such as present traffic conditions, yellow pages information or a hotel guide. Based on the present vehicle position and a required target position, a suitable route may be calculated, for example in a computer, and communicated to the driver optically and acoustically. The electronic map may either be located on data carriers in the vehicle itself or in a control center that is in radio contact with the vehicle and where calculation of a route is effected.

Electronic maps for vehicle navigation systems originate from national ordnance survey maps, supplementary conventional maps and Differential-GPS/GLONASS surveys. The achievable local resolution corresponds well with the local resolution of present GPS receivers for the mass market. A disadvantage of the said electronic maps is the fact that they are short-lived, due to GPS receivers of a higher resolution being introduced to the market, making even better map material desirable, or due to more accurate basic data, i.e. aerial photographs, being available.

An additional major disadvantage of electronic map material generated in the conventional way lies in the fact that the only land-based applications of major economic importance are applications for vehicles. Although some useful applications have been proposed in this field, in addition to the above navigation system for example systems for fleet management, automatic emergency calls and anti-theft systems, requirements of these systems in map material vary greatly. Therefore, in most cases, an electronic map is optimized for one of this systems only. When considering in addition the said risk that map material ages quickly, many a project which is useful to the public, which could be easily realized technically, will often be doomed due to an unacceptable cost-to-performance ratio.

German Patent 195 26 291 discloses a method for collection and linking of positional data obtained by satellite localization and other data, wherein at least one vehicle travels through substantially all roads of one or several continuous areas, with a satellite localization device continuously and automatically gathering positional data relating to the actual position of each vehicle. Moreover, a camera is used for taking pictures of traffic signs.

From German Patent Application 37 44 532 it is known to enter start and target positions by entering street identifications and house numbers in a navigation system. From German Patent Application 195 05 487 and Japanese Patent Applications 09 033 270 and 09 033 271 (Abstracts) it is known to use stored and displayed image informations as an additional assistance for navigation.

An object of the present invention is to provide a method for collection and linking of positional data from satellite localization and other data, not only allowing very accurate vehicle navigation systems, useful in the long term, but also many other applications not limited to vehicles.

A further object of the present invention is to employ this method in generation of a database for a vehicle guidance system, a fleet management system, an automatic vehicle emergency call system, a vehicle anti-theft system or for a system for simulation and/or visualization of real environments.

SUMMARY OF THE INVENTION

In a method for collection and linking of positional data obtained by satellite localization and other data, at least one vehicle travels through substantially all roads of one or several continuous areas, with a satellite localization device continuously and automatically gathering positional data relating to the actual position of each vehicle and with one or several cameras taking pictures of individual adjacent buildings, substantially from a horizontal point of view. The postal addresses of buildings contained in the taken pictures are determined, with at least the house numbers being determined by means of house number signs on the buildings. For each individual building the positional data, data relating to the postal address and at least one digitized picture of the building are linked together and recorded in a database.

In a method for generation of a database for a vehicle guidance system, a fleet management system, an automatic vehicle emergency call system, a vehicle anti-theft system or for a system for simulation and/or visualization of real environments, the method comprising: (1) traveling with at least one vehicle through substantially all roads of one or several continuous areas, with a satellite localization device continuously and automatically gathering positional data relating to the actual position of each vehicle and with one or several cameras taking pictures of individual adjacent buildings, substantially from a horizontal point of view; (2) determining the postal addresses of buildings contained in the taken pictures, with at least the house numbers being determined by means of house number signs on the buildings, and (3), for each individual building, linking together and recording in a database the positional data, data relating to the postal address and at least one digitized picture of the building.

A vehicle guidance system, a fleet management system, an automatic vehicle emergency call system, a vehicle anti-theft system or a system for simulation and/or visualization of real environments, which system is based on collected and linked positional data obtained by satellite localization and other data, which are generated by: (1) traveling with at least one vehicle through substantially all roads of one or several continuous areas, with a satellite localization device continuously and automatically gathering positional data relating to the actual position of each vehicle and with one or several cameras taking pictures of individual adjacent buildings, substantially from a horizontal point of view; (2) determining the postal addresses of buildings contained in the taken pictures, with at least the house numbers being determined by means of house number signs on the buildings, and (3), for each individual building, linking together and recording in a database the positional data, data relating to the postal address and at least one digitized picture of the building.

In a preferred embodiment of the present invention, additional environmental survey data are collected during travel, such as data relating to environmental contamination by electro-smog, ozone, radioactivity, etc. These data are also recorded in the database by linking to the other data.

Positional data are preferably generated by using the well known Differential-GPS/GLONASS (DGPS/DGLONASS). DGPS/DGLONASS is a differential correction of GPS/GLONASS data based on reference data, as to achieve a local accuracy subject to a tolerance in the order of one meter. This accuracy is not only necessary but also adequate for the method of the present invention. Differential correction may either be performed by a device in a traveling vehicle, the device being preferably provided with reference data from an existing comprehensive mobile communications network, or by post-editing. Post-editing requires to record within the vehicle for each position of the vehicle the accurate point of time corresponding to this position.

The recorded postal address comprises in the first place the house number and the name of the street or road and may in addition include appropriate names of city districts, names of cities etc., depending on the size of the area detected. The house number must always be determined optically, for example by direct view by a passenger in the vehicle, entering them immediately either manually or verbally into a computer, or by post view of any pictures taken. The name of a street or road may be found in the same manner by means of street signs. For part of some countries like Germany there exist computer files including the geographic positions of streets. This data files may be used for an automatic determination of the street names. Another possibility for automatic determination of a house number and/or the name of a street is based on the use of an automatic optical character recognition system (OCR), either locally in a vehicle or during post-editing of pictures.

Film cameras or still cameras may be used. Although conventional cameras based on celluloid film may be used in principle, the products of which are digitized at a later point of time, digital video cameras are preferred for two reasons. Firstly, it is more beneficial to take digital pictures directly and secondly, their data carriers may be reused for other trips.

Although a digital still camera provides the best image quality, this quality is only obtained when stopping a vehicle in front of each building. When a digital still camera is used, the pictures, which are preferably subjected to data compression, may be saved on computer-readable data carriers together with positional data and possibly names of streets and/or house numbers. Should no differential correction have taken place in the vehicle, accurate recording times are additionally saved. The data carriers are taken to a control center where differential correction and other evaluations may take place, if required. Should a radio communications network of adequate transmission capacity by available, radio transmission of picture data for further evaluation may also be considered.

If a video camera is used, for example a commercial digital video camera of 25 frames, i.e. 50 fields per second, fast traveling through streets without stopping will be feasible. The large volume of data collected may easily be stored on magnetic tapes, normally used for cameras, possibly assisted by standard data compression techniques, with coordinates or with coordinates and times and possibly with names of streets/house numbers being recorded on an audio channel or in blank lines of the video signal. However, the exposure time per frame will have to be reduced to allow shooting from a moving vehicle. In addition, pictures must be taken from a sufficient height of at least 1.5 meters in order to avoid the camera's view being obliterated accidentally by vehicles on the roadside. In addition, a continuously operated commercial video camera would normally take many useless shots, but non-productive times could be used for taking enlarged pictures of an area where house numbers can be normally found by means of mirror systems or similar arrangements. In addition, perspectives of buildings and, if the camera allows, infrared shots, for example, may be taken. Any additional pictures obtained in this way at low cost, which may be optionally shot with one or several still cameras, will allow additional applications.

The described recording technique used during travel does not require a special license for slow travel and stops, as required for the first option described where pictures were taken during stops. However, it is difficult and prone to errors to enter house numbers whilst a vehicle is moving. In this case therefore it is rather recommended to find house numbers during post-editing.

The two recording techniques described above, whilst stopped and moving, may be combined in order to use the benefits of both techniques. An example for the said combined method is to drive along a route by a two-wheeler, in particular a motorbike, equipped with a satellite localization device, an electronic memory and a data entry device. The motorbike driver will be able to stop without impeding the flow of traffic and enter each house number, preferably by a voice recognition system used as a data entry device, with the house number being recorded together with appropriate coordinates and possibly times. Subsequently, the route is followed again by a vehicle with a high superstructure, also equipped with a satellite localization device, to which any data collected by the motorbike are transmitted by transfer from a data carrier or by radio, with the camera being triggered automatically at any house number position determined before.

As described, all steps of the method, with the exception of traveling along the streets or roads, may be performed automatically. And even the driver as such may be dispensed with under certain circumstances by assembling an apparatus for automatic execution of the method to a vehicle, which travels along the streets anyhow. Vehicles of local waste collection companies, traveling along all the streets and roads of an area and practically stopping in front of every house, would be suitable.

Conventional vehicle navigation systems will link any surveyed positions to cartographic positions, providing last not least nothing again but geographic information displayed to the user in a more or less abstract form, such as signposts or maps. In contrast to this, according to the present invention, surveyed geographic positions are linked to postal addresses and associated horizontal views of buildings, thus providing a much wider spectrum of information.

This allows much improved vehicle navigation, both for private and commercial applications as well as for local authority duties, such as the guidance of police and rescue services vehicles. Firstly, the ability to navigate by street and house number results in a much higher accuracy than in the past. Secondly, this allows access to a large continuous area, for example the whole road network of Germany. Thirdly, due to navigation being effected "accurate to house numbers", no other improvements will be required or desirable in the long term. Fourthly, it is possible to navigate by pictures of a real environment, displayed to the driver of a vehicle. This is much more conducive to human understanding than abstract maps or instructions for direction, for example, therefore more ergonomic and will help to eliminate erroneous decisions, In addition to the said vehicle navigation, the method according to the present invention allows many other useful applications once completed. For example, an automatic emergency call system, automatically generating an emergency call and being directed to an emergency center by mobile communication when a collision sensor detects vehicle accidents, may simultaneously transmit the name of the street and the house number of the site of an accident, thus allowing the site of an accident to be found faster. Such an emergency call system is not limited to vehicles, but may be a portable unit, for example, permanently carried by a person at risk in one way or another. The passengers of a called rescue vehicle may in turn obtain an idea of the site of an accident and its environment whilst traveling to the site.

Other options for application are offered when using a computer connected to a database generated in accordance with the present invention. When selecting an picture of a building, its house number and position may be found. Reversely, the picture and the position may be found by entering the house number. This will save local inspection, for example during planning, official approval procedures or the allocation of environmental survey data.

In addition, virtual travel through visualized streets, composed of pictures of buildings, is possible on the computer, thus allowing the residential environment within towns and/or on streets being viewed, in which each individual house can be identified, including its number. This is a facility for taxi drivers or forwarders, for example, the latter especially prior to transporting highly bulky or hazardous goods, to become familiar with local conditions in a city and/or at a destination without contaminating the environment. On the other hand, taxi drivers will no longer need to memorize all the street names of a city when a taxi is equipped with a navigation system, based on the present invention, for which entry of a street name and house number of the destination will be sufficient.

Streets cannot only be displayed two-dimensionally by means of a computer, but also three-dimensionally in so-called "virtual reality". In a virtual reality device, streets and their surroundings may be presented not only visually, but for example as a reduced three-dimensional model that can be touched by a data glove. This is an opportunity for blind persons, for example, to obtain their own three-dimensional idea of specific local conditions without danger.

Other applications are offered by interactive television of the future, with views of buildings and possibly any other information being accessed from a database and displayed on any suitably equipped TV monitor.

Other objects, features and advantages of the present invention will become apparent from the detailed description given hereinbelow and from the accompanying drawings of the preferred embodiments, which, however, should not be taken to be limitative to the present invention, but are for explanation and understanding only.

DESCRIPTION OF THE PREFERRED EMBODIMENTS

Figure 1:
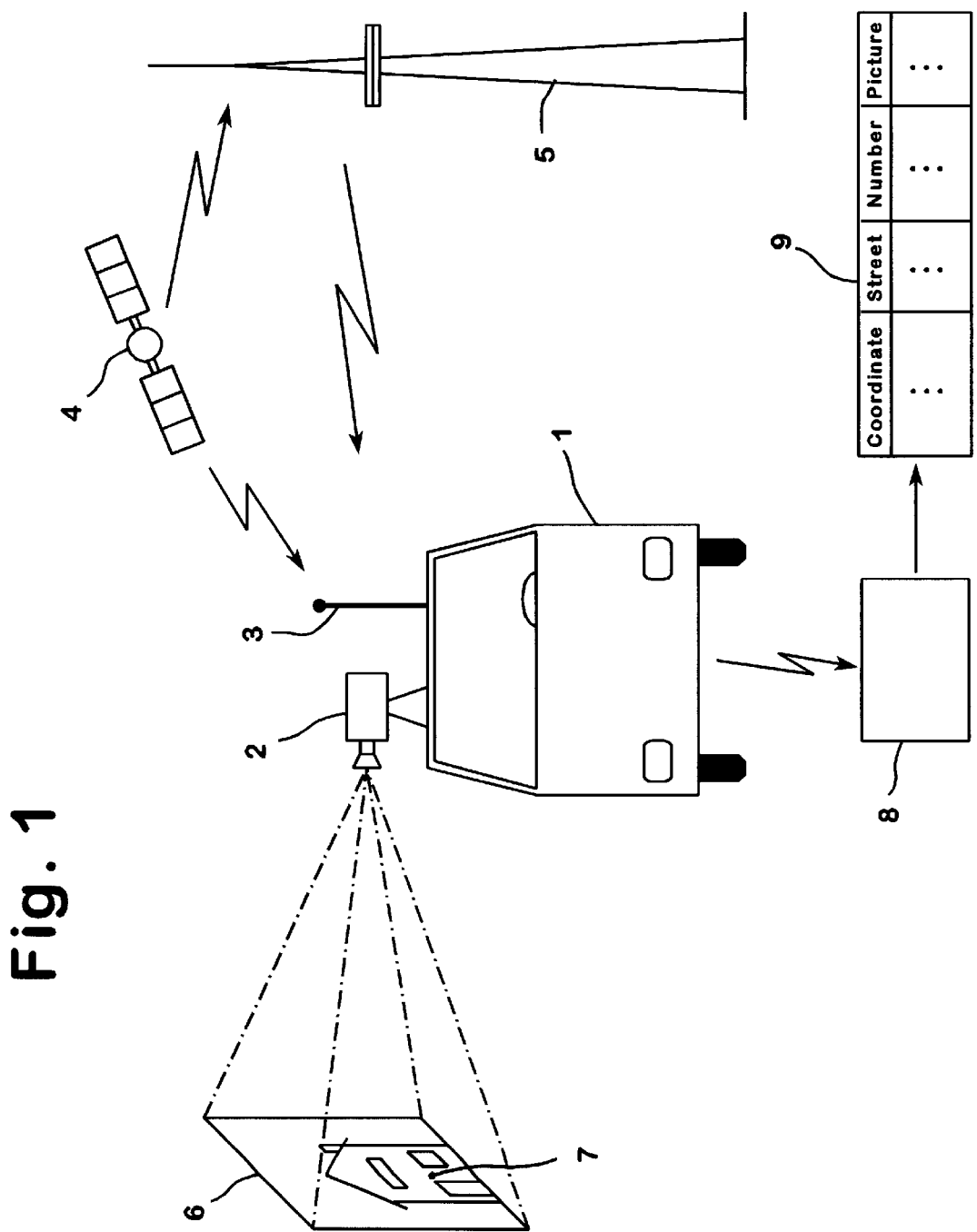
FIG. 1 is a schematic diagram for explanation of a first embodiment of the method for collection and linking of positional data obtained by satellite localization according to the present invention.
Figure 2:
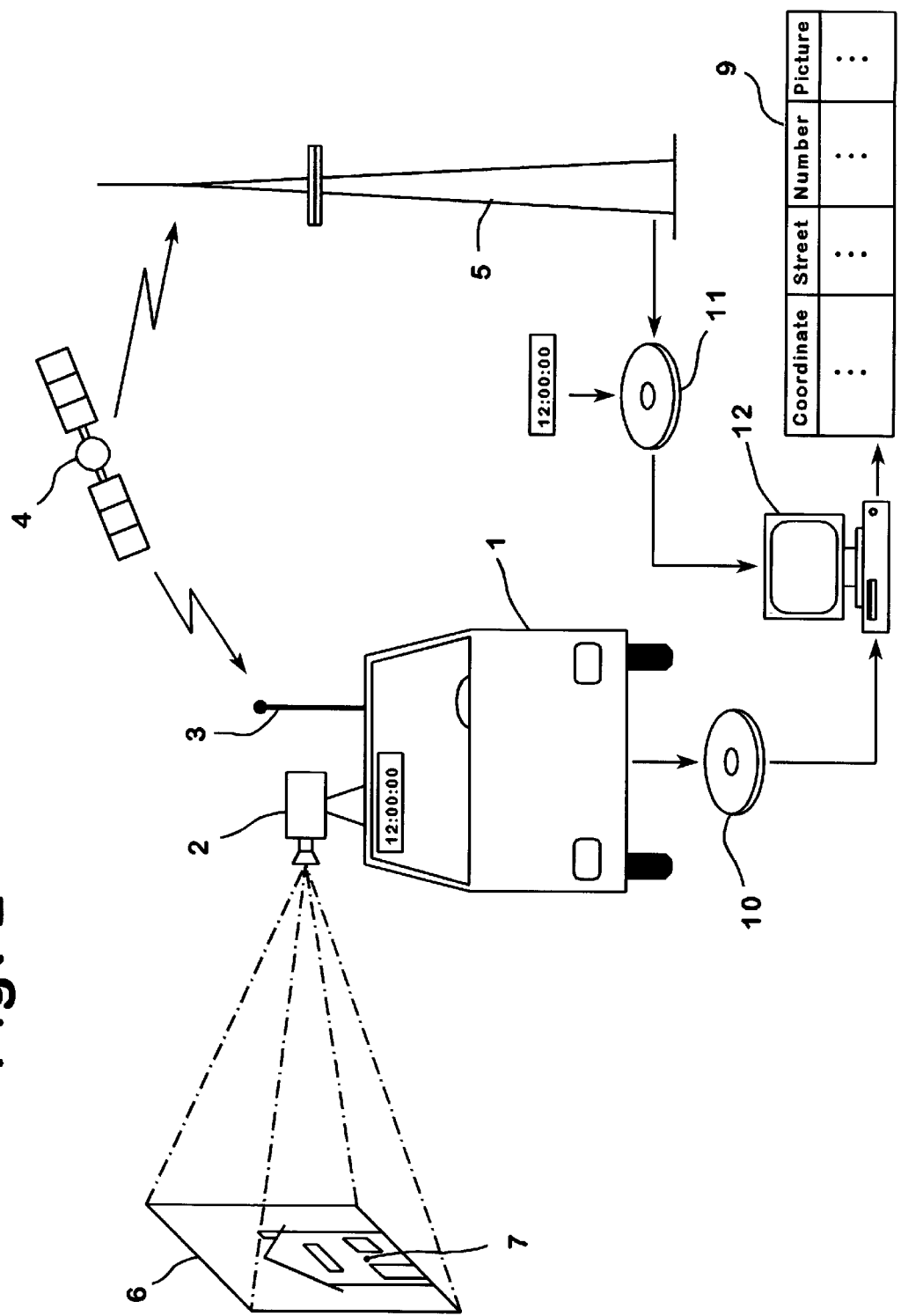
FIG. 2 is a schematic drawing for explanation of a second embodiment of the method according to the present invention.

In FIG. 1 and FIG. 2, a vehicle 1 travels along all the streets and roads of a developed area in either direction. A digital camera 2 is installed on the vehicle 1 at a minimum height of 2 meters, substantially shooting horizontally sideways. In narrow or one-way streets, two cameras may be used, shooting directly to the left-hand and the right-hand side, thus allowing these streets to be traveled only once.

Vehicle 1 comprises a GPS/GLONASS receiver 3, which is symbolized in the Figures by its antenna. The receiver 3 receives signals of a minimum of three each of twenty-four GPS satellites 4 and GLONASS satellites 4 in space. Normally, signals are required from four satellites, but there is a so-called "clockhold" process for which three satellites will be adequate under certain conditions. By joint evaluation of the artificially adulterated GPS signals and the unadulterated GLONASS signals, the actual geographical position of the vehicle is obtained subject to an accuracy of six to sixteen meters in 95% of all cases.

In addition, the receiver 3 will receive radio signals from a reference station 5 having a precisely known location, also receiving the satellites 4. Together with the reference data, the actual geographic position of the vehicle 1 can be accurately calculated with a tolerance of less than one meter at a small distance from the reference station 5, with each 100 kilometers of distance adding approximately one meter of inaccuracy. Consequently, only one reference data transmitter—for example of the Mainflingen Radio Transmission Center near Frankfurt, Germany, transmitting the said reference data—will be able to allow a determination of accurate positions subject to tolerances of five meters approximately in the whole area of Germany. Owing to the fact that a house has an average width of approximately ten meters, an accuracy of five meters or less is desirable for localization for any allocation of house numbers, as described hereafter.

In order to reach other areas, too, in which no reference data transmitter can be received reliably or with an adequate resolution, reference data may be transmitted at low cost to the vehicle 1 via a mobile data radio network (i.e. Modacom) or as a so-called Short Message Text (SMT) through the data channel of a mobile radio network (in Germany D1, D2, E2, for example). The data transmission channel need not be available continuously, but it will be adequate for transmitting data in intervals of 0.1 to 2 minutes.

Camera 2 will take a picture 6 of each building on the appropriate side of the street. The picture 6 may be transmitted to a control center 8, together with any surveyed coordinates, the house number 7 of a building and the name of a street by mobile radio. In the control center 8, the data are recorded in a database 9, as shown in the diagram.

The presently available mobile data radio network cannot smoothly handle the data volume generated. Therefore it is preferred at present to record data on a mobile data carrier in a vehicle for later transmission to a control center, as described in the embodiment of FIG. 2.

In the embodiments of FIG. 1 and FIG. 2, the house number 7 and the name of the street just traveled are being entered by an observer in vehicle 1 either manually by a keyboard or verbally by means of a voice recognition system. Should appropriate databases exist, the name of the street may also be entered automatically from the said database.

The embodiment shown in FIG. 2 differs from the embodiment of FIG. 1 in that the said data are not differentially corrected in the vehicle 1 but only at a later point of time. This means that there is no on-line but an off-line correction. For this purpose it will be sufficient to receive in the vehicle 1 the GPS/GLONASS satellite data including readings such as time, almanach, ephimeres, status, etc. and to record these.

The satellite data including time, house numbers and names of streets as well as the pictures are transmitted by the vehicle 1 to a mobile data carrier 10. In other places, reference data are transmitted by the reference station 5, together with the accurate time, to a mobile data carrier 11. The data carriers 10 and 11 are evaluated at a later point of time in a computer system 12 in which the GPS/GLONASS coordinates will be differentially corrected, based on reference data and times and in which the database 9 is created.

The following is a description of various further embodiments of the recording technique by using the camera 2 or several cameras, without any detailed reference to the drawings, with digital still cameras and video cameras being used alternatively or in combinations of the same, It would be simplest to take a picture from a vehicle stopped in front of a house, equipped with a digital still camera and a wide-angle lens and to simultaneously record the position and the house number. Special licenses would be required for slow driving and stops over approximately 800,000 kilometers of streets and roads (2×400,000 kilometers) for 13 million houses in Germany, for example. In addition and due to the vehicle being stopped in a place occasionally, from where a house number is not visible, one must also assume that house numbers will not be completely recorded. However, the best image quality and the most accurate coordinates would result. There is a possibility for taking pictures from a stationary position from several directions, such as directly from the front and in perspective somewhat towards the side. Still pictures of a good resolution may be directly recorded on computer-readable data carriers. Subject to no-loss compression, a size of 0.15 megabyte per picture results, thus in case of two pictures per house approximately 3,900 gigabyte would be required.

A shooting technique based on digital or analog film cameras or video cameras should be considered for recording from a traveling vehicle. For commercial digital video cameras, which are preferred for the present invention—due to digital pictures being available immediately —25 frames per second will be recorded, each frame including one pair of interleaved fields. The normal exposure time of 1/50 second will be reduced to 1/600 second, for example, in order to reduce blurring of pictures due to movement of the camera. While traveling at moderate speed, pictures of still adequate quality will be obtained. More advanced digital cameras allow to allocate the surveyed geographical position to each individual frame.

In current video cameras of two fields per frame, the quality of individual frames is mildly suffering due to movement of the camera. This problem may be reduced by techniques for simultaneous exposure of both fields, as offered by so-called "progressive scan cameras", for example. In addition, there are special digital cameras allowing field problems to be eliminated by a so-called photo mode.

When pictures are taken with film cameras from a traveling vehicle, house numbers may be determined by subsequent visual post-editing of pictures. In this case it may be useful to record house numbers by an additional camera having a teleobjective, directed to the level where normally house number signs can be found. This additional camera may be an analog camera, but should preferably be a digital camera, due to the pictures of house numbers no longer being required after conversion to alphanumeric characters. A "digital camera" in this case is considered to be a camera by which not only digital picture data are taken but also recorded, i.e. with recording not being effected in an analog way as in current H-8, VHS or SVHS systems, but nearly without any loss and interference on special magnetic tapes suitable for digital storage. Alternatively, optical data carriers (i.e. CD-R, WORM), magneto-optical data carriers (MOD, EOD), magnetic harddisk data carriers and universal computer data carrier tapes of various formats may be used, too.

An operating film camera, having a current image frequency, would normally produce many surplus pictures. Data carriers may be better utilized by accommodating additional enlarged pictures for house numbers or oblique views of buildings between frontal global views. These may be produced, for example, by a camera being connected in series with an optical system, comprising a moving mirror, driven by a stepper motor and possibly other mirrors and/or lenses, thus forming an optical switch by which the camera is exposed in sequence to various views of a building and/or its environment.

In addition, several pictures of one and the same building may be taken, for example, by a mobile camera or several cameras from several heights and/or several angles in order to obtain a three-dimensional impression.

The picture sequences of building perspectives may be subject to computer-assisted editing in order to simulate recorded areas three-dimensionally and/or to visualize them.

In addition, building dimensions may be calculated from the said perspectives. Dimensional data of buildings will also be recorded in the database. If dimensions of buildings are accessible, i.e. by house number and name of the street, several additional applications are possible.

What is claimed is:

1. A method for generation of a database for a vehicle guidance system, a fleet management system, an automatic vehicle emergency call system, a vehicle anti-theft system or for a system for simulation or visualization of real environments, the method comprising:

(1) traveling with at least one vehicle through substantially all roads of one or several continuous areas, with a satellite localization device continuously and automatically gathering positional data relating to the actual position of each of the at least one vehicle and with one or several cameras taking pictures of individual adjacent buildings, substantially from a horizontal point of view;

(2) fixedly allocating each individual picture with said positional data, and thereafter storing said fixedly allocated picture with said positional data on one computer readable recording medium;

(3) determining the postal addresses of buildings contained in the taken pictures, with at least the house numbers being determined by the house number signs on the buildings, and (4) for each individual building, linking together and simultaneously recording in a database the positional data, data relating to the postal address and at least one digitized picture of the building.

2. The method of claim 1 wherein the computer readable recording medium is on the at least one vehicle.

3. The method of claim 1 wherein the computer readable recording medium is at a remote location and the step of storing said fixedly allocated picture with said positional data further comprises transmitting said fixedly allocated picture with said positional data to a control center for recording on the medium.

4. A method for generating a computerized database of potential data, comprising the steps of:

a) traveling with at least one vehicle through substantially all roads of one or more continuous areas, and taking pictures of individual adjacent buildings, during said traveling step, substantially from a horizontal point of view from one or more cameras mounted on the at least one vehicle;

b) continuously and automatically gathering positional data relating to the actual position of each of the at least one vehicle via a corresponding satellite localization device;

c) fixedly allocating each individual picture with said positional data;

d) thereafter temporarily storing said fixedly allocated picture with said positional data on one computer readable recording medium e) determining postal addresses of buildings contained in said taken pictures, wherein at least the house numbers being identified by the house number signs on the buildings, and f) linking, for each individual building, the positional data, the postal address, and the at least one digitized picture for the building, and g) simultaneously recording the linked data of step f) in a database.

5. The method according to claim 4, wherein the step (a) further includes the step of collecting additional environmental survey data from said at least one vehicle, and wherein step f) further includes linking, for each individual building, said additional environmental survey data with said positional data, said postal data, and said at least one digitized picture.

6. The method according to claim 4, further comprising the step of correcting said positional data utilizing a Differential-GSP/GLONASS based on reference data.

7. The method according to claim 6, wherein the correcting step includes receiving reference data in said at least one traveling vehicle over a mobile radio communications network.

8. The method according to claim 4, wherein the postal address for each individual building includes at least the house number and the name of the street.

9. The method according to claim 4, wherein at least a portion of the postal address is determined visually and entered manually or verbally by an observer.

10. The method according to claim 4, wherein at least a portion of the postal address is determined by an automatic character recognition system.

11. The method according to claim 4, wherein at least a portion of the postal addresses are determined from existing data files of geographic positions, said at least a portion of the postal addresses including at least the street names of the postal addresses.

12. The method according to claim 4, wherein at least one of the one or more cameras is a digital still camera.

13. The method according to claim 12 wherein the step (a) further includes stopping the at least one vehicle in front of each building.

14. The method according to claim 12, wherein the step (a) further includes generating picture data with the digital still camera, and compressing and recording said picture data on a computer-readable data carrier.

15. The method according to claim 4, wherein at least one of the cameras is a digital video camera.

16. The method according to claim 15, wherein the pictures of the buildings are being taken by a continuously operated camera whilst the at least one vehicle is passing the buildings.

17. The method according to claim 16, wherein the continuously operatier camera is connected in series with an optical switch for feeding the continuously operatier camera in sequence with various views of buildings and their environment.

18. The method according to claim 4, wherein said one or more cameras is arranged on the vehicle at a minimum height of 1.5 meters.

19. The method according to claim 4, wherein the at least one vehicle includes a pair of vehicles, and the traveling step further includes the vehicles sequentially traveling the area, wherein one of the vehicles is a motorbike being equipped with the corresponding satellite localization device of the motorbike and a data entry device for allocation of geographic positions and house numbers and wherein the other vehicle is of a greater height than said motorbike, and includes a satellite localization device and at least one camera, wherein the at least one camera is automatically triggered in the positions for each house number, determined by the motorbike.

20. The method according to claim 4, wherein the step f) further includes determining dimensions of the buildings from the taken pictures, and wherein the step g) further includes recording said dimensions.

21. The method of claim 4 wherein the computer readable recording medium is in the at least one vehicle.

22. The method of claim 4 wherein the computer readable recording medium is at a remote location and the step of storing said fixedly allocated picture with said positional data further comprises transmitting said fixedly allocated picture with said positional data to a control center for recording on the medium.

* * * * *